T. O. THEOBALD.
TANK GAGE.
APPLICATION FILED JUNE 7, 1917.
1,259,680.
Patented Mar. 19, 1918.
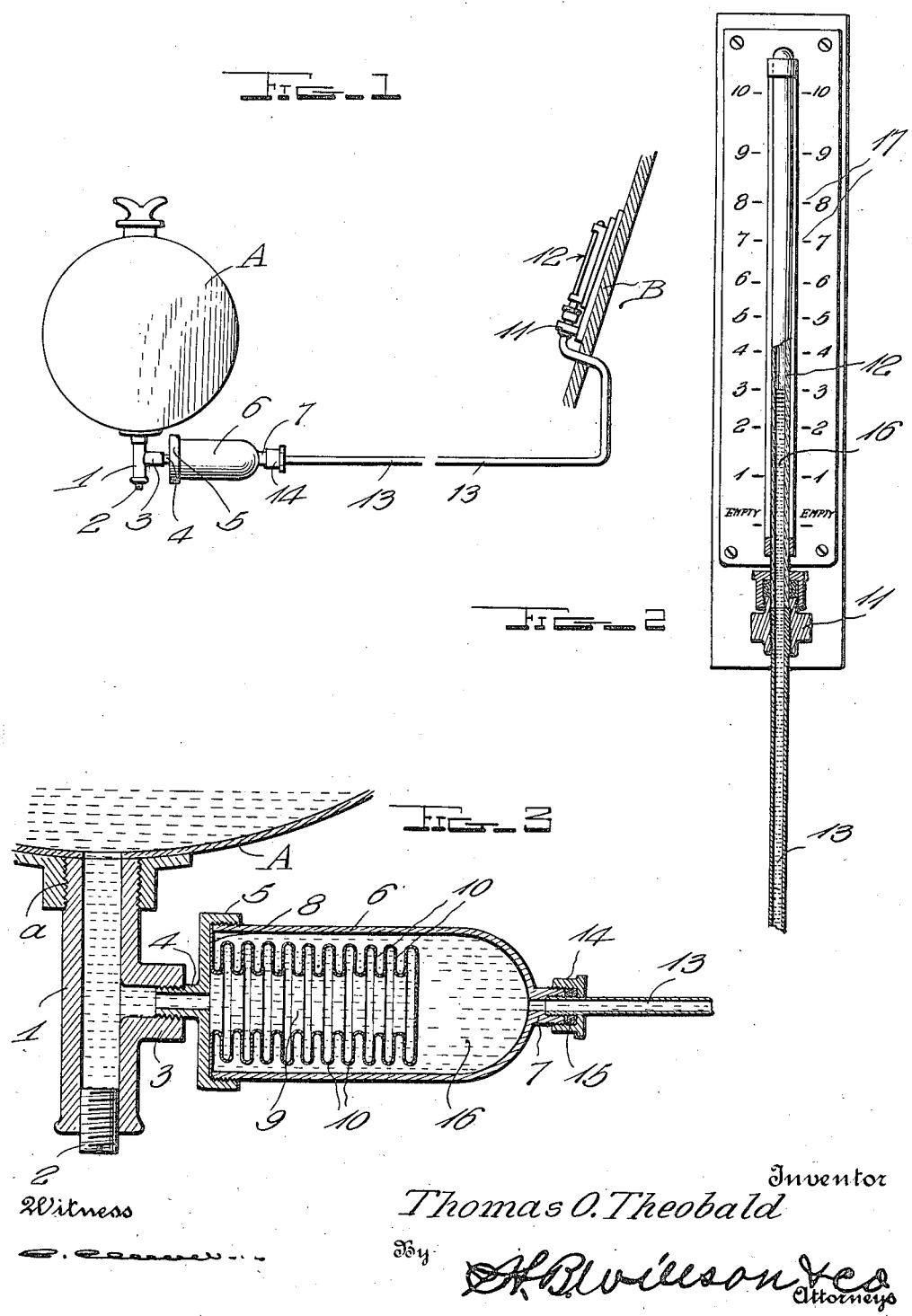
Witness
Inventor
Thomas O. Theobald
By H. B. Willson & Co.
Attorneys

UNITED STATES PATENT OFFICE.

THOMAS O. THEOBALD, OF DETROIT, MICHIGAN.

TANK-GAGE.

1,259,680.  Specification of Letters Patent.  Patented Mar. 19, 1918.

Application filed June 7, 1917. Serial No. 173,337.

*To all whom it may concern:*

Be it known that I, THOMAS O. THEOBALD, a citizen of the United States, residing at Detroit, in the county of Wayne and State of Michigan, have invented certain new and useful Improvements in Tank-Gages; and I do declare the following to be a full, clear, and exact description of the invention, such as will enable other skilled in the art to which it appertains to make and use the same.

This invention relates generally to measuring devices, and more particularly to certain new and useful improvements in tank gages.

The primary object of the invention is to provide means for indicating on the dashboard of an automobile or other motor vehicle, the amount of fuel contained in the tank which is usually disposed beneath one of the seats of the automobile or other vehicle, or concealed from the view of the occupants of the vehicle.

Another object of the invention is to provide a device of this character which will be of extremely simple, strong, durable and inexpensive construction, one which will be efficient and reliable in operation and well adapted to the purpose for which it is designed.

With these and other objects in view, the invention consists of certain novel features of construction, combination and arrangement of parts as will be hereinafter fully described and claimed.

In the accompanying drawing in which similar reference characters designate like parts throughout the several views:

Figure 1 is a conventional sectional view through a portion of an automobile, showing a device constructed in accordance with this invention applied thereto;

Fig. 2 is a front elevation of the indicator; and

Fig. 3 is a longitudinal sectional view through the casing which is attached to the bottom of the fuel tank, a portion of the latter being also shown in section.

Referring more particularly to the drawing, the letter A designates the fuel tank of an automobile, which is usually located and concealed beneath the front seat of the same. This tank A is provided with a vertically disposed internally threaded opening *a* in its bottom, which usually receives a plug. For the purpose of applying this invention thereto, this plug is removed and threaded in the opening *a* is a coupling member 1, which is preferably in the form of an ordinary T-coupling. Into the end of the coupling member 1 which is disposed in alinement with the end fitted in the opening *a* is threaded a plug 2. This plug 2 may be removed when the tank A is to be drained of any sediment or the like.

The nipple 3 which extends horizontally from one side of the coupling member 1 is in this case internally threaded to receive a nipple 4 which extends centrally outwardly from the outer side of a cap 5. The cap 5 is threaded to the open end of a hollow cylindrical horizontally disposed casing 6, the end of which opposite the open end is provided with a central outwardly extending nipple 7 the purpose of which will be hereinafter described. Clamped between the open end of the casing 6 and the adjacent or inner side of the cap 5 is the flat flange 8 of a collapsible chamber 9. This collapsible chamber 9 has a collapsible annular side wall formed as shown with deep corrugations 10 of thin metal, although it is to be understood that it may be constructed in any other convenient manner. The open end of the chamber 9 communicates with the interior of the tank A through the nipples 3 and 4 and the coupling member 1.

The reference numeral 11 designates a support which is attached preferably to the dashboard B of the automobile, and upon which is mounted in any suitable manner a gage tube 12, the latter being connected to one end of a tube 13 which has its other end connected to the nipple 7 of the casing 6. Threaded on the nipple 7 is a cap member 14 containing suitable packing material 15, the purpose of which will be obvious.

Disposed within the tubes 12 and 13 and within the casing 6 exteriorly of the chamber 9 is an indicating liquid 16, which is preferably colored to allow its level in the tube 12 to be readily ascertained by referring to the graduations 17 on the support 11.

When the device is first applied to the tank, a sufficient amount of this liquid 16 is to be placed within the casing and tubes so that its level in the tube 12 will be at zero on the graduations. As the tank is filled with fuel, a small amount of this fuel will pass through the coupling member 1 and into the chamber 9 and cause the latter to expand. Owing to the fact that the liquid 16 is disposed around the walls of the chamber 9 and adjacent one end of the same, as the chamber 9 expands, a certain amount of this liquid will be forced out of the casing 6 and consequently its level in the tube 12 will rise. Hence a very efficient manner of indicating the quantity of fuel in the tank has been provided, and the objects of the invention have been effectively carried out.

As various changes in form, proportion and in the minor details of construction may be resorted to without departing from the spirit of this invention, it is to be understood that I do not wish to be limited to the precise construction herein shown and described.

I claim:

In a device of the character described, the combination of a fuel tank having an opening in the bottom thereof, a coupling member threaded in said opening and provided with a horizontally extending nipple on one side thereof, a hollow cylindrical horizontal casing provided with a nipple at one end thereof and at its other end with a removable cap, the latter being provided with a nipple having threaded connection with the nipple of said coupling member, a collapsible chamber disposed within said casing and having a flange at one end thereof clamped between the open end of the latter and the adjacent side of said cap, said chamber communicating through said coupling member with the interior of said tank and being spaced from the wall and other end of said casing, a gage tube, a tube connected at one end to said gage tube and at its other end to the nipple formed on said casing, and an indicating liquid disposed within said tubes and said casing exteriorly of said chamber.

In testimony whereof I have hereunto set my hand in the presence of two subscribing witnesses.

THOMAS O. THEOBALD.

Witnesses:
JNO. C. SULLIVAN,
S. HOMER FERGUSON.